United States Patent Office 3,350,044
Patented Oct. 31, 1967

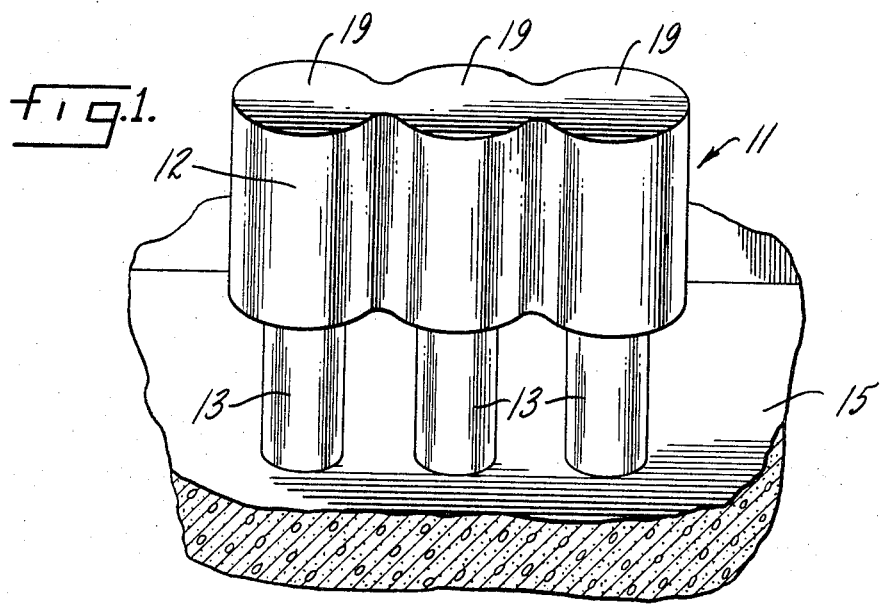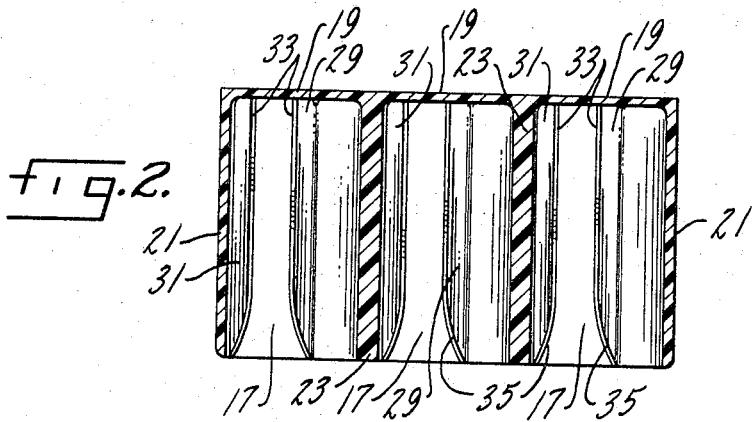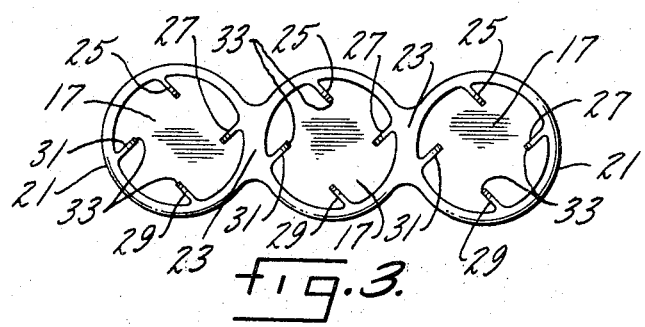

3,350,044
CONDUIT POSITIONING DEVICE
Richard F. Zulauf, Sycamore, Ill., assignor to Ideal Industries, Inc., Sycamore, Ill., a corporation of Delaware
Filed July 5, 1966, Ser. No. 562,891
2 Claims. (Cl. 248—49)

This invention relates to a conduit installation aid and is concerned with a device to space and position conduits, especially construction project conduits which are used to receive and house electrical conductors, such as wires, cables and the like.

A primary object of this invention is an integral unit for spacing and positioning a plurality of conduits at predetermined fixed distances from one another.

Another object is a unit adapted to cover the ends of a plurality of spaced conduits to prevent the entry of foreign materials into said conduits.

Another object is a unit adapted to easily slide onto conduits and to provide a tight interlock when fully seated on the conduits.

Another object is a unit whch can be used for ether rigid conduit or electrical metallic tubing of the same nominal size but of different outside diameters.

Another object is a unit which may be formed with any desired number of passageways of similar or varying cross-sections.

Another object is a unit which may be formed with passageways spaced varying distances apart.

Another object is a unit which may be formed with passageways arranged in the same relationship as the knockout covers of an electrical junction box.

Other objects may be found in the following specification, claims and drawings.

The invention is illustrated more or less diagrammatically in the following drawings wherein:

FIGURE 1 is a perspective view of a conduit closure and positioner unit in place on conduits extending through a concrete structure;

FIGURE 2 is a vertical cross-sectional view through the unit of FIGURE 1; and

FIGURE 3 is a bottom plan view of the unit of FIGURE 1.

FIGURE 1 shows a conduit positioning and closure unit 11 fitted over the ends of three spaced conduits 13 which are extending through a construction member such as a poured concrete floor 15. The unit 11 is formed as a body 12 having a plurality, in this case three, of longitudinally extending passageways 17. The passageways are closed at one end of the body by walls 19 which merge into one another in the embodiment shown to form an integral end wall for the unit. In this embodiment, the passageways are of circular cross-section defined by cylindrical walls 21. The walls of adjacent passageways merge at 23 to form the integral body 12. The diameters of the passageways shown in this embodiment are substantially equal and each is preferably selected to receive a tube or conduit of a predetermined nominal size, but means are provided to accommodate tubes or conduits of the same nominal size which have slightly different outside diameters.

The passageways 17 of the unit shown in the drawings are aligned in spaced relationship to one another so that the distances between the axes of adjacent passageways are equal to the axial spacings between adjacent conduits. The axial spacing between adjacent conduits is determined by the distance between the centers of adjacent knockout openings in the walls of electrical junction boxes. Thus, it can be said that the axial distances between adjacent passageways are the same as the distances between centers of adjacent knockout holes of an electrical junction box.

The means to accommodate conduits of the same nominal size, but of different outside diameters are resilient ribs, vanes or fins 25, 27, 29 and 31. The ribs are connected to the curved walls 21 of the body members and project towards the interior or central portions or axes of the passageways. It will be seen that such ribs are radially misaligned, by which is meant that the inner edges, such as 33, of the ribs do not coincide with any radius of the circular passageways. Such ribs from angles with the curved walls and each of the ribs forms an angle to substantially the same degree and substantially in the same general direction relative to the curved walls. In referring to the ribs being turned in the same general direction relative to the curved walls, it is meant that all of the ribs are turned to either a clockwise or counter-clockwise position. The disposition of the ribs enhances the yield of the ribs in accommodating a conduit having a variable outside diameter within a given nominal size.

It is preferable that such ribs be formed integrally with the curved walls of the body section from a material of semi-rigid plastic. The thickness of such ribs should be sufficiently thin so that the ribs appropriately yield to accommodate a larger conduit or tubing, and the ribs should be sufficiently resilient so as to remain snugly positioned against an inserted conduit. The bottom corners of such ribs are preferably rounded as at 35 to form lead-in radii for easier mounting on conduits.

Although a body unit having three passageways of circular cross-section is shown in the drawings, it should be understood that units having more or less passageways could also be integrally formed in accordance with the number of conduits to be positioned in spaced relationship to one another by the unit. For example, the body member could be formed with two passageways in spaced relationship or any number greater than two. An advantage of this unit is that it can also be used simply as a cap on a single conduit although this is not the primary use of the unit.

It should also be understood that whereas this unit is shown with the passageways aligned, they could also be formed offset to one another if, for some particular reason, such an arrangement of conduits was desired. For example, the passageways could be arranged in the form of an L. Other arrangements of the passageways could also be formed integrally in a body unit depending on the particular needs of the situation. However, the alignment of the passageways shown in the drawings is the preferred arrangement since in most instances the knockout openings in electrical fixture boxes will be positioned in a straight line.

Further, the spacing between the axes of adjacent passageways could vary if the spacings between the conduits varied. However, as a general rule, the knockout openings in the conduit boxes will be spaced equal distances apart and this spacing will determine the desired spacing of the conduits.

Additionally, it should also be understood that the adjacent passageways could be formed in different sizes spaced parallel to one another. Other arrangements of varying sizes and alignments of conduits would also be possible depending on the particular arrangement of conduits to be installed. However, the preferred form of the invention as shown in the drawings features a body member having passageways of substantially the same cross-sections and spaced equal distances apart to accommodate and position similar sized conduits spaced equal distances from one another.

The use, operation and function of this invention are as follows:

It is desirable during the installation of conduits or tubing in construction projects to position the conduits rigidly in spaced relation to one another. This is especially the case where the tubing or conduit must be installed to extend through a poured concrete structure such as a floor or wall. The conduits are generally installed first with the concrete being poured around the conduits. In such an operation, it is necessary both to hold the conduits in spaced relationship to one another and to cover the open ends of the conduit to prevent the entrance of foreign material such as the concrete which is being poured.

The unit of this invention is especially adapted to rigidly position a plurality of conduits in a predetermined spaced relationship to one another and to prevent the entry of foreign material into the ends of the conduits. This invention is particularly adapted to positioning a plurality of conduits of the same nominal size, which extend out of an electrical fixture box. To accomplish this purpose, the unit is molded as an integral body 12 having a plurality of passageways of substantially equal cross-section with the axes of the adjacent passageways spaced equally apart from one another. The distances between the axes of the adjacent passageways are made to be the same as the distances between the centers of adjacent knockout covers in an electrical junction box. The number of passageways in the body may equal the number of knockout covers on one side of an electrical junction box. Since the knockout covers in an electrical junction box are usually arranged in a straight line, the preferred form of this invention will have the passageways also arranged in a straight line.

To permit the passageways to receive a variety of tubes and conduits of differing outside diameters within the same nominal sizing, the passageways are equipped with flexible and resilient ribs which are radially misaligned so that they will flatten outwardly against the walls defining the passageways when tubes of larger outside diameter are installed therein. The use of such ribs also facilitate the positioning of the unit on conduits and, in effect, provides a floating mounting between the unit and each conduit. Additionally, because the friction effect from the deflected ribs increases as the unit is pushed farther on to the conduits, the unit resists accidental removal from the conduits.

The rib angle, means the angle to a radial, has been shown at approximately 45°, however this may vary somewhat. Substantially smaller angles approaching a radius will result in excessive installation forces. Substantially greater angles will cause excessive rib length. A rib angle of approximately 45° has the advantage of providing a minimum contact surface of a certain amount between the ribs and the outside of the conduits.

In addition, the ribs also prevent the unit from cracking when it is subject to rather wide ambient temperature variations. For example, the cap may be used in climates where it is subject to 0° F. and lower temperatures in the winter and 90° F. and higher temperatures in the summer. If the cap is made of plastic or a similar material, the coefficient of thermo-expansion will be greater for the unit than it will be for the metal of the conduit. Thus, the floating mounting provided by the ribs allows for substantial expansion and contraction without causing the sides of the unit to crack.

Although the unit is shown as having passages arranged in a straight line and of the same cross-sections and spacings from adjacent passageways, it should be realized that the unit may be constructed in a variety of manners without departing from the teachings of this invention. For example, a unit might be molded for a specific type of outlet box in which there is a plurality of knockout openings of different cross-sections arranged in a configuration other than a straight line. A positioning and closure unit having passageways of similar cross-sections and spacings to that of the knockout openings on the box could be molded in an integral piece and used to support and cover conduits extending from the box through said openings. Therefore, the teachings of this invention should be limited only by the foregoing claims interpreted in view of the preceding specification and drawings.

I claim:

1. A unit for positioning a plurality of conduits in spaced relationship to one another including a body having a plurality of passageways formed therein, each passageway adapted to receive a conduit, said passageways extending generally parallel to and in spaced relationship to one another, each passageway being of circular cross-section formed by a continuously curved wall, a plurality of ribs connected to each curved wall with each rib forming an angle with a radius through the line of contact of the rib and the curved wall with all the ribs turned to substantially the same degree in the same direction relative to the curved wall, said ribs being flexible and resilient in order to yield in a direction away from the axis of their passageway to accommodate conduits of various outside diameters.

2. The structure of claim 1 further characterized in that the continuously curved walls surrounding each passageway merge into contact with the wall of at least one adjacent passageway to form an integral unit.

References Cited

UNITED STATES PATENTS 3,160,175  12/1964  Laemmla _____ 138—96

FOREIGN PATENTS 1,157,436  11/1963  Germany.

JOHN PETO, *Primary Examiner.*

CLAUDE A. LE ROY, *Examiner.*